United States Patent [19]
Townsley et al.

[11] Patent Number: 5,623,677
[45] Date of Patent: Apr. 22, 1997

[54] APPARATUS AND METHOD FOR REDUCING POWER CONSUMPTION IN A COMPUTER SYSTEM

[75] Inventors: David B. Townsley, Cupertino; Wing-Hong Chow, San Jose; Michael D. Johnson, San Jose; Helder Ramalho, San Jose, all of Calif.

[73] Assignee: Apple Computer, Inc., Cupertino, Calif.

[21] Appl. No.: 609,969

[22] Filed: Feb. 29, 1996

Related U.S. Application Data

[63] Continuation of Ser. No. 242,252, May 13, 1994, abandoned.

[51] Int. Cl.$^6$ .................................................. G06F 15/00
[52] U.S. Cl. ................................................... 395/750
[58] Field of Search .......................................... 395/750

[56] References Cited

U.S. PATENT DOCUMENTS

| | | |
|---|---|---|
| 4,870,570 | 9/1989 | Satoh et al. |
| 5,167,024 | 11/1992 | Smith et al. ............... 395/375 |
| 5,239,652 | 8/1993 | Seibert et al. ............. 395/750 |
| 5,392,437 | 2/1995 | Matter et al. ............. 395/750 |

*Primary Examiner*—Ayaz R. Sheikh
*Assistant Examiner*—Jeffrey K. Seto
*Attorney, Agent, or Firm*—Blakely, Sokoloff, Taylor & Zafman

[57] ABSTRACT

A method and apparatus for reducing the power consumption of a processor in a computer system where a programming structure running on the processor determines when the processor is in an inactive state to cause clocking signals and the power supply to be disabled to the processor. The processor is again coupled to the power supply and the clock signals in response to a periodic interrupt signal, a non-periodic interrupt or a bus request from a peripheral device. Thereafter, the programming structure signals the control logic again when the processor reenters the inactive state, such that the control logic disables the clock signals and decouples the power supply to the processor when the processor returns to the inactive state. The method is extended to offer the ability to shut down the processor from programming structures running on alternate masters or subsystem controllers within the same system.

12 Claims, 10 Drawing Sheets

APPARATUS AND METHOD FOR REDUCING POWER CONSUMPTION IN A COMPUTER SYSTEM

This is a continuing application of Application Ser. No. 08/242,252, entitled "Method And Apparatus For Reducing Power Consumption In A Computer System", filed May 13, 1994, now abandoned.

FIELD OF THE INVENTION

The present invention relates to the field of computer power consumption, and more particularly to a scheme for reducing power consumption in a processor of a computer system.

BACKGROUND OF THE INVENTION

Typically, a computer system contains a processor, a bus, and other peripheral devices. The processor is responsible for executing instructions using the data in the computer system. The bus is used by the processor and the peripheral devices for transferring information between one another. The information on the bus usually includes data, address and control signals. The peripheral devices comprise storage devices, input/output (I/O) devices, etc.

Portable computers are common in the market today. These portable computers, often referred to as laptop and notebook computers, are often powered by batteries. Being that a battery only provides power for a specific duration (i.e., its battery life), efforts are currently being made to extend the battery life. In other words, for the same weight and performance of the computer system, efforts have been concentrated on maximizing the life of the computer system battery.

One method of extending the battery life is to reduce power consumption in the computer system. Power consumption may be reduced by powering up parts of a computer system only when they are required. In the prior art, there are many schemes for monitoring and controlling the consumption of power to a data processing device or devices when full operation is not desired or necessary. Many of them involve controlling the amount of power consumption of a memory unit. In at least one other system, described in U.S. Pat. No. 4,381,552, a "wait" signal is generated causing the processor to enter a standby mode. In the standby mode, power consumption is reduced. Often this is accomplished by stopping the processor clock since most of the power used is dynamic or switching power, and proportional to clock frequency. However, some processors contain dynamic cells internally, requiring constant clocking. Therefore, the stopping of a clock is not an option.

Another prior art technique for reducing power consumption in a computer system is U.S. Pat. No. 5,239,652 wherein the operating system running on a central processing unit (CPU) determines when the CPU is not actively processing and generates a signal that causes the CPU to be disconnected from the power supply. Periodically in response to pulses sent by a periodic timer or interrupts, the CPU is powered on, at which time the CPU performs any tasks that have arisen since the CPU has been powered off. Only interrupts or a periodic event is used to trigger the exit from the powered off state. It is only after exiting the powered off state that the computer system will be responsive to other types of operations, such as bus requests. However, it is desirable to allow other computer system operations to cause an exit from the powered off state. Also in this prior art technique, only the operating system running on this CPU is responsible for determining when to be powered down. Therefore, the CPU may only be powered off from the CPU sub-system of the computer system. It may be desirable to turn off the processor from the input/output (I/O) portion of the computer system, in the case of, for example, an alternate processor operating as a "master" in the system.

Many of the prior art power down techniques do not permit exiting the power down sequence once it has been initiated. That is, once the sequence of events to power down a device or computer system has begun, it must be completed before returning to full power. This may result in a large latency between handling interrupts. Thus, it may be desirable to abort the power down of a device or computer system prior to entering the powered down state to reduce interrupt servicing latency.

By disabling the power to the CPU, the CPU may still be receiving clocking signals. Driving the clocks while the CPU is in the powered off state could cause damage to the CPU. Thus, it is desirable to stop clocking of the integrated circuit when the integrated circuit is to be powered down.

Many mechanisms exist in the prior art to provide clocking signals. For instance, phase-locked loops (PLLs) have been used to provide clocking signals. A PLL produces clock signals in accordance with a reference clock signal. The PLL becomes synchronized, or "locked" to the reference clock signal after a period of time. The PLL must attain lock every time upon powering up. If clock signals are turned off by turning off a PLL, the time required to power up can be no shorter than the time to attain lock again. Such a time period may appear to be too long and impact the responsiveness of a computer system. However, if an integrated circuit needs to be clocked by a PLL device due to strict or fast timing requirements, stopping and starting the clock may add intolerable latencies to responsiveness. Thus, if the clock signals are not going to be received by the integrated circuit during some period of time, then it should be done such that the time from enabling the clocks to providing valid clock signals is minimized.

The present invention provides for powering down a processor that is clocked by an external PLL clock source. In addition, in the present invention, events other than interrupts can cause the processor to exit the powered down state. Also the present invention provides for controlling the powering down of a processor from both sides of a computer system: the I/O portion or expansion side and the processor subsystem side. The present invention provides a power down bypass or abort method for late arriving interrupts to reduce interrupt servicing latencies. The present invention also provides an alternate method of powering down the processor as well as powering down other parts of the system to serve a low power "sleep" mode. The present invention also provides for disabling the clocks to the processor, without incurring a delay in the PLL achieving lock when re-enabling the clocks to the processor (power-up).

SUMMARY OF THE INVENTION

A method and apparatus for reducing the power consumption of a processor in a computer system is described. The present invention includes a programming structure running on the processor that determines when the processor is in an inactive state. The programming means causes a signal to be generated if the processor is in the inactive state. The signal is received by control logic that controls power and clocking signals to the processor. The control logic in response to the signal from the programming means generates two signals, one to a phase-locked loop that clocks the processor and a second to a switch that connects the processor to the power supply. The signals from the control logic disable the clock signals to the processor and then decouple the power supply to the processor when the processor is in the inactive state. The clock signals from the PLL are disabled while maintaining synchronization.

In the present invention, the control logic also controls the switch and the PLL to couple the processor to the power supply and then enable the clock signals in response to a periodic interrupt signal, a non-periodic interrupt or a bus request from a peripheral device. Thereafter, the programming structure signals the control logic again when it determines that the processor again reenters an inactive state, such that the control logic disables the clock signals and decouples the power supply to the processor until the next interrupt or bus request. The present invention also offers an abort path to prevent processor power down in the event of a late arriving wake-up event (e.g., interrupt), and offers a power-down method to support a system low power sleep mode where the contents of memory are preserved.

BRIEF DESCRIPTION OF THE DRAWINGS

The present invention is illustrated by way of example and not limitation in the figures of the accompanying drawings and in which like references indicate similar elements and in which:

FIG. 2 is a flow chart that shows the process of generating the power off signal when the processor is powered on;

DETAILED DESCRIPTION OF THE INVENTION

A method and apparatus for operating a microprocessor in a reduced power consumption state is described. In the following detailed description, numerous specific details are set forth, such as specific interrupts, numbers of clocks, signal names, etc., in order to provide a thorough understanding of the present invention. However, it will be apparent to one skilled in the art that the present invention may be practiced without these specific details. Also, well-known circuits have been shown in block diagram form, rather than in detail, in order to avoid unnecessarily obscuring the present invention.

Overview of the Computer System

Figure 1:
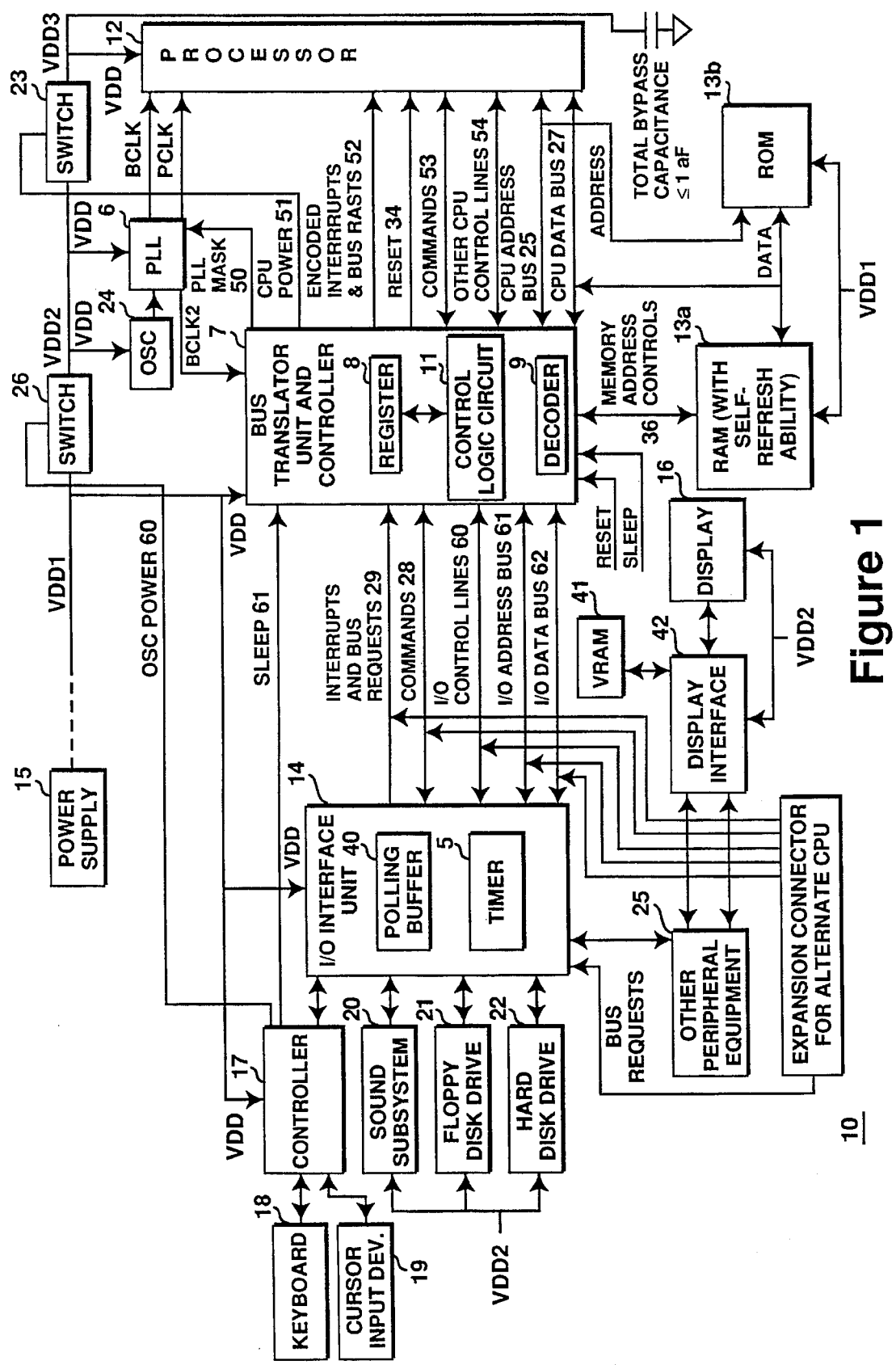
FIG. 1 is a circuit block diagram of the computer system including one embodiment of the power conservation apparatus.

Referring to FIG. 1, an overview of a computer system of the present invention is shown in block diagram form. The present invention may be implemented on a general purpose microcomputer, such as one of the members of the Apple personal computer family, one of the members of the IBM personal computer family, or one of several other portable computer systems which are presently commercially available. Of course, the present invention may also be implemented on a multi-user system while encountering all the costs, speed and function advantages and disadvantages available with these machines. The preferred embodiment of the present invention is implemented on an Apple Powerbook™ computer system developed by the assignee of the present invention.

As illustrated in FIG. 1, the computer system of the present invention generally comprises a processor 12 coupled to a bus translator unit and controller 7. Processor 12 is coupled to receive encoded interrupts and bus requests via lines 52 and a reset signal 34 from bus translator 7. The processor 12 sends commands to the bus translator 7 on lines 53. Also coupling the processor 12 and bus translator 7 are other processor control lines 54, an address bus 25, and a data bus 27. The processor 12 is also coupled to memory 13 comprised of Random Access Memory (RAM) 13a and Read Only Memory (ROM) 13b, wherein data is transferred on the processor data bus 26 to and from RAM 13a and ROM 13b. Addresses are sent to ROM 13b using address bus 25. Addresses and other control signals are transferred via lines 26 between the bus translator 7 and RAM 13a.

Processor 12 also receives BCLK signals and PCLK signals from Phase Lock Loop (PLL) 6. In the currently preferred embodiment, the PCLK signal has a frequency that is twice that of the BCLK signal. PLL 6 generates the clock signals in response to an oscillating frequency signal generated by oscillator 24. PLL is controlled by a PLL mask signal 50 from bus translator 7. PLL 6 also provides BCLK signals to bus translator 7.

Processor 12, bus translator 7, oscillator 24 and PLL 6 all are powered by power supply 15. Processor 12 receives its power through switch 23. Switch 23 is coupled to receive a power signal 51 controlled by bus translator 7.

Also coupled to bus translator 7 and receiving the power supply voltage is I/O interface unit 14. I/O interface unit 14 is coupled to bus translator 7 through a series of control lines 60, address bus lines 61 and data bus lines 62. I/O interface unit 14 also sends interrupts and bus requests via lines 29 to the bus translator 7. Similarly, bus translator 7 sends commands via lines 28 to I/O interface unit 14.

The computer system further includes peripheral devices coupled to the I/O interface unit. For instance, the computer system includes a display device 16, such as a cathode ray tube, liquid crystal display, etc., including its associated controller circuitry. Also included is a controller device 17 that controls access to an alpha-numeric input device 18 including alphanumeric and other keys, etc., for communicating information and command selections to the processor 12, and a cursor control device 19, such as a trackball, stylus, mouse, or trackpad, etc., for controlling cursor movement. A sound subsystem 20 may also be coupled to the I/O interface unit 14 for providing audio recording and playback information. The sound subsystem may include a sound circuit and its driver which is used to generate various audio signals from the computer system and may include a path through which a modem can make sounds. I/O interface unit 14 also may provide access to a floppy disk and driver 21 and a hard disk drive 22. Other peripheral components 23 may be coupled, which can include a serial communication controller and its drivers, a parallel communication controller and its drivers, a modem and/or a LAN such as ethernet and its driver. Each of the peripheral units is powered by power supply 15.

It is to be appreciated that the peripheral units are conventional devices used in prior art computers and consequently a description of the units is not included herein. It should be noted that although units 16–23 are included within the computer system, it is typically a design choice to include these devices in the computer system and the computer system can readily operate as a functioning computer without the presence of some of these units.

Several additional devices are included within the bus translator 7 and I/O interface unit 14 to provide functionality described in the present invention. For instance, bus translator 7 includes a register 8 for containing information regarding the state of the processor, a control logic circuit 11, and a decoder 9. I/O interface unit 14 includes a timer 5. The timer 5 and decoder 9, in conjunction with the switch 23, the clock pulse oscillator 24, and the PLL 6, are included in the computer system to function in connection with the control logic circuit 11.

The computer system 10 also includes an expansion slot through a Processor Direct Slot (PDS) connector. The PDS allows another master (e.g., processor card) to be coupled into the system. A processor connected through the slot can request the processor bus and gain control of it using software on the card.

In functional terms, processor 12 is the central processing unit for computer system 10. In the preferred embodiment, processor 12 is one of the 68000 family of processors (e.g., 68040) manufactured by Motorola Corporation. RAM 13a and ROM 13b are used to store the operating system of computer system 10 as well as other programs, such as file directory routines and application programs, and data inputted from I/O interface unit 14. ROM 13b is used to store the operating system of computer system 10. RAM 13a is utilized as the internal memory of computer system 10 for accessing data and application programs. Processor 12 accesses RAM 13a and ROM 13b via an address bus 25. Address and control signals in connection with the operation of RAM 13a are sent from processor 12 to memory 13a via the bus translator 7 and lines 26.

A bidirectional data bus 27 is intercoupled between processor 12, RAM 13a, ROM 13b and bus translator 7. The data are communicated via bidirectional data bus 27 between processor 12, RAM 13a, ROM 13b and bus translator 7 in response to the commands provided by processor 12 under the operating system running on it. Bus translator 7 acts as a memory controller for RAM 13a and ROM 13b and provides bus translation to the other I/O bus (e.g., a 16-bit I/O bus). Bus translator 7 also controls power cycling of the processor 12 to obtain additional battery run time.

Power supply 15 is typically a DC power source, such as a battery and a regulator, which provides a constant DC power to various units of computer system 10, particularly processor 12. The clock pulse oscillator 24 provides a series of clock pulses for the necessary timing references that are needed for the operation of computer system 10. The output CLK of clock pulse oscillator 24 is coupled to units within computer system 10 through PLL 6 to synchronize the operation of computer system 10. In addition, the PLL 6 provides the clocking signals (which can be gated) to processor 12.

Input/output interface unit 14 is a conventional, intelligent input/output interface controller which interfaces with various input/output devices 16–23. The disk driver 21 is used to access the disk storage medium, such as a floppy disk. In computer system 10, a hard disk 22 is coupled and accessed by the parallel communication controller included in the other peripheral equipment 23. The other peripheral equipment 23 may further include a modem. Processor 12 controls the operation of the conventional, intelligent input/output interface unit 14 with its peripheral devices 16–23 by sending the commands through bus translator 7 to I/O interface unit 14 via command bus 28. The data transfer between I/O interface unit 14 and its peripheral equipment 16–23 generate interrupts in I/O interface unit 14 and the interrupts and bus requests are coupled to processor 12 via lines 29.

The operating system running on processor 12 takes care of basic tasks such as starting the system, handling interrupts, moving data to and from memory 13 and peripheral devices 16–23 and bus requests from device(s) 23, via input/output interface unit 14, and managing the memory space in memories 13a and 13b. In the preferred embodiment, the operating system further provides the functions of monitoring programs running on processor 12 and providing an indication, in the form of at least one signal, to control logic circuit 11 via address bus 25 and the decoder 9 when it determines that processor 12 is no longer actively processing a program and ready to go to an inactive state. These functions will be described in more detail below in connection with FIGS. 2–4.

Timer 5, controlled by clock pulse oscillator 24, generates a VBL interrupt signal within the input/output interface unit 14 once every approximately 1/60th of a second (frequency of 60 Hz). The periodic VBL interrupt signal is also applied from timer 5 as an output of I/O interface unit 14 directly to control logic circuit 11 through the interrupts lines 29. Combining the VBL interrupt signal with other interrupt signals and bus requests from peripheral units 16–23, I/O interface unit 14 issues an interrupt signal via lines 29 to control logic circuit 11 as well as processor 12 via bus translator 7 and lines 52. When the system is running, these interrupts occur at least as often as the VBL interrupt, or 60 Hz.

When processor 12 receives an interrupt signal, it is interrupted from its normal operation and responds to the interrupt in the conventional manner provided by the operating system. During the interrupt cycle, processor 12 executes its regular interrupt routine which includes a periodic monitoring routine. The periodic monitoring routine performs the functions of updating the real time clock, checking the power supply and sending an auto poll command. The auto poll command is associated with the auto poll method of the preferred embodiment in which the processor 12 automatically interrogates (polls) devices coupled to input/output interface unit 14 to determine the presence of data for transfer. Processor 12 controls the operation of the peripheral units 16–23 through I/O interface unit 14 by sending its commands through bus translator 7 via command bus 28 to I/O interface unit 14.

To save power with processor 12, the power is turned off repeatedly during idle periods to achieve a low duty cycle of power resulting in longer run times on batteries. The present invention uses periodic task scheduling of the operating system and support in the operating system for determining when to turn off power to the processor, and restoring the processor state and program counter upon power-on. The present invention employs a periodic interrupt source, such as a timer (e.g., timer 5) or some other event, that allows processor 12 to wakeup when it occurs and be restored to the state it was in when turned off and check any tasks that may have become pending in the interim period while it was off. If no tasks have become pending, then software resumes the power off state. Hardware in the system is responsible for detecting the interrupt and turning the processor on and off. Note that in the present invention, the event may be a bus request to the processor bus (e.g., the local bus) where the bus request (or an interrupt) can originate from devices in an expansion card connected to the PDS expansion connector. Although the present invention will be described with reference to processor 12, the present invention may be applied to digital signal processors, co-processors or other processing or high energy consumption units in the computer system. The present invention may also be applied equally well to processing devices that offer some low power modes.

In order to provide the control over the consumption of power by computer system 10 for the purpose of conserving the power consumption of processor 12 when it is not actively executing programs, the operating system of computer system 10 checks the status of processor 12 at every interrupt cycle to determine whether processor 12 is actively processing programs or remaining in an inactive state waiting for data to be transferred for processing. If it is determined that the processor 12 is an inactive state, the operating system issues a reserved address via address bus 25 to decoder 9 at an interrupt. Decoder 9 then recognizes the reserved address and signals the control logic circuit 11 to generate the PLL mask signal 50 and the power signal 51. In the preferred embodiment, both the PLL 6 mask signal 50 and the power signal 51 are active low. Decoder 9 is a decoder/comparator which compares addresses over bus 25 with the reserved address, and when the reserved address is issued, decoder 9 signals control logic circuit 11 using a power cycle initiation signal (not shown).

Under the control of the power cycle initiation signal, control logic circuit 11 asserts the PLL mask signal 50 which in turn causes the clock signals to be masked while maintaining the clocks within the PLL 6 in phase lock internally. Also the control logic circuit 11 deasserts the power signal 51 that is output to the switch 23 (which is typically a p-channel power MOSFET) which in turn switches off the $V_{DD}$ power to processor 12 from the power supply 15. While processor 12 is kept off by switch 23 under the control of the deasserted power signal 51 and the processor clocks stopped low by the PLL under control of the asserted PLL mask signal 50, other units in the computer system 10 are still fully powered by the power supply 15.

Controlled thereafter by the other VBL signal from timer 5 and other interrupts input from input/output interface unit 14 via lines 29, control logic circuit 11 generates a periodically asserted power signal 51 to switch 23 and a deasserted PLL mask signal 50 to PLL 6 such that the power from power supply 15 and clocks from the PLL 6 are resumed for a short time interval in order to poll the peripheral devices coupled to the I/O interface unit 14 and to perform other operating system tasks which may need periodic updating. The time interval is only as long as is required to poll the peripheral devices and perform those operating system tasks. As the VBL signal is generated by timer 5 at every approximately 1/60th of a second, control logic circuit 11 is ensured of asserting the power signal 51 to switch 23 and the PLL mask signal 50 at least as often as every approximately 1/60th of a second, regardless of whether an interrupt is generated at I/O interface unit 14 by any peripheral units.

The frequency of the periodic VBL interrupt signal is not necessarily 1/60th of a second, but is a workable frequency providing a periodic interrupt. In other computer systems, any desired frequency signal could be utilized, as long as it provides some reasonable timeframe (e.g., 30–60 Hz or more often) for the operating system to poll tasks and appear responsive to the user.

Under the periodically deasserted power signal 51 and periodically asserted PLL mask signal 50, switch 23 periodically connects the power supply 15 and PLL 6 outputs the clock signals to processor 12, respectively, and the asserted processor reset signal is also coupled to the reset pin of processor 12 from the control logic circuit 11 via line 34. This processor reset signal is separate from the reset signals elsewhere in the system, since it needs to cycle when the processor cycles. Control logic circuit 11 asserts the processor reset signal to the reset pin of processor 12 while it is off, until processor 12 resumes normal full time operation. The asserted processor reset signal from the control logic circuit 11 is provided to processor 12 only when the processor 12 has been disconnected from power supply 15 by a deasserted power signal 51 from the control logic circuit 11. In other words, if the processor 12 is already powered on when a periodic interrupt occurs, the asserted reset signal will not be issued from circuit 11.

For each power-on interval controlled by the periodically asserted power signal 51 and deasserted PLL mask signal 50, processor 12 is brought back to full functionality. Processor 12 then interrogates devices that need to be polled (for example, floppy disc driver 21) and does other housekeeping work which may be specified by the operating system as dictated by the user. During each power-on interval, processor 12 also runs the operating system to determine whether full power supply should be resumed on processor 12 (i.e., whether further power cycling should be discontinued for some time interval, usually 1–2 seconds). If the operating system determines that processor 12 is requested to resume its normal operation, the power cycle initiation signal from decoder 9 is simply not re-asserted to control logic circuit 11 (i.e., the operating system stops writing to the power cycle bit in register 8 for some period of time). When the operating system again determines that the processor 12 is inactive (e.g., only performing basic housekeeping chores and no additional work for the user), the operating system begins re-initiating power cycles by accessing the power cycle bit in register 8 in bus translator unit and controller 7.

In short, the power conservation arrangement for processor 12 of computer system 10 is achieved by having the operating system running on processor 12 check at a predetermined regular time interval the state of processor 12. If the operating system determines processor 12 is not actively processing, it issues the power off signal indicating the inactive state of processor 12. The signal is sent out of processor 12 through address bus 25 and is decoded by decoder 9 to become the power cycle initiation signal. Decoder 9 then applies the power cycle initiation signal to control logic circuit 11. Controlled by the power cycle initiation signal, control logic circuit 11 asserts the PLL mask signal 50 to mask the clocks signals from PLL 6 to the processor 12 and deasserts the power signal to switch 23 to remove the $V_{DD}$ power supplied by the power supply 15 from processor 12. The reset signal is generated by control logic circuit 11 to reset processor 12 on the next periodic power-on interval. The reset signal is asserted until the power cycle initiation signal is cleared from control logic circuit 11.

Timer 5 runs even when processor 12 is powered off. It provides the periodic VBL interrupt signal at a predetermined time interval which in this case happens to be approximately 1/60th of a second. The periodic VBL interrupt signal is applied to control logic circuit 11 to ensure the power signal 51 is asserted periodically to switch 23 and the PLL mask signal 50 is deasserted. Under the periodically asserted power signal, full power supply $V_{DD}$ is brought back onto processor 12 for a predetermined time interval, and brought out of a reset state. Likewise, under the deasserted PLL mask signal 50, processor 12 is fully clocked. Running periodically, processor 12 can interrogate (poll) the peripheral devices in the I/O subsystem that need polling and do other system housekeeping work which the operating system may require as specified by the user. In this case, the user does not perceive a difference. The conventional I/O interface unit 14 includes, as part of its normal circuitry, a polling buffer 40 that stores status information about the peripheral devices 16–23, including particularly floppy disc driver 21. Polling buffer 40 is accessed during each polling operation so that processor 12 will be able to check out whether the polled device has changed its status or not. If polling buffer 40 indicates that the polled device has changed its status, processor 12 then is required to handle the status change. For example, when the user inserts a disc to disc driver 21, the status of disc driver 21 is changed and the change is detected during the polling operation. Processor 12 execution is then required to update the display 16 to indicate such insertion.

RAM 13a, ROM 13b and I/O interface unit 14 are separately powered from processor 12. During the power cycling period for processor 12, RAM 13a, ROM 13b and I/O interface unit 14 remain fully powered.

The present invention employs a separate video subsystem having its own frame buffer memory 41. Frame buffer memory 41 is a VRAM maintaining the state of all pixels on the display 18. A display controller 42 is also coupled to the frame buffer memory 41 which is also separately powered with power supply 15. During the power cycling period for processor 12, display controller 42 obtains information from frame buffer memory 41 and maintains the information displayed on the display 16. In this way, the user does not perceive a difference in the computer's operation even though the processor 12 is off. Thus, the power cycling of the present invention is transparent to the user.

During each power-on interval, the operating system is run to decide whether normal operation on processor 12 is required and, if so, discontinue removing the power supply and clock signals to processor 12 by not re-asserting the power cycle initiation signal applied to control logic circuit 11 from decoder 9. If the operating system does not require normal operation (e.g., system is idle), the operating system re-asserts the power signal 51, which starts the processor power-off process again.

By this arrangement, processor 12 is only powered off at a given frequency when it is not actively processing. During each power-on interval, processor 12 may execute any miscellaneous "housekeeping" work which the computer user may require and determines when normal power supply should resume on processor 12. In this way, as much as 95% of processor power saving is obtained and this power saving is transparent to the user.

Figure 2:
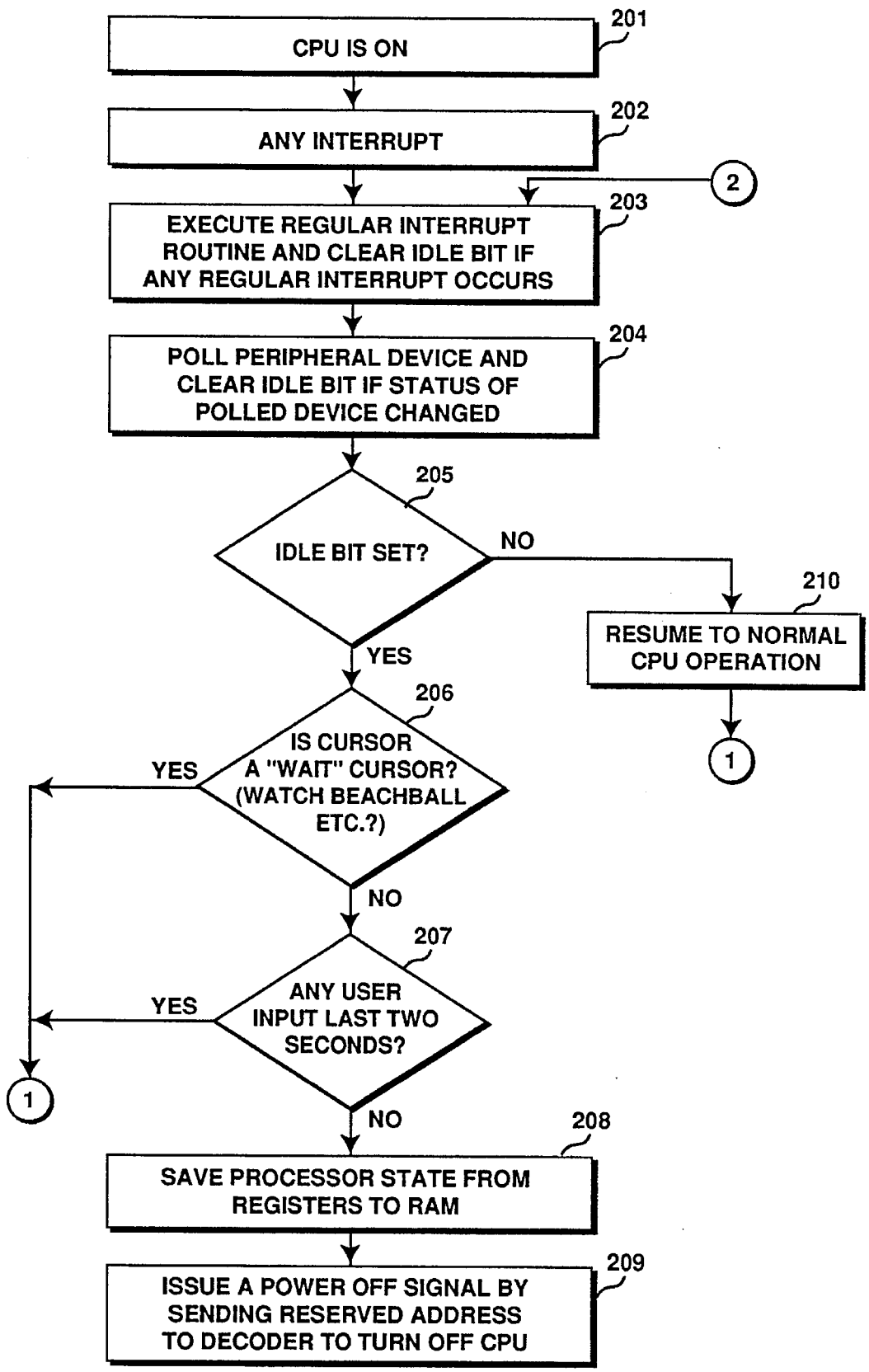
Figure 3:
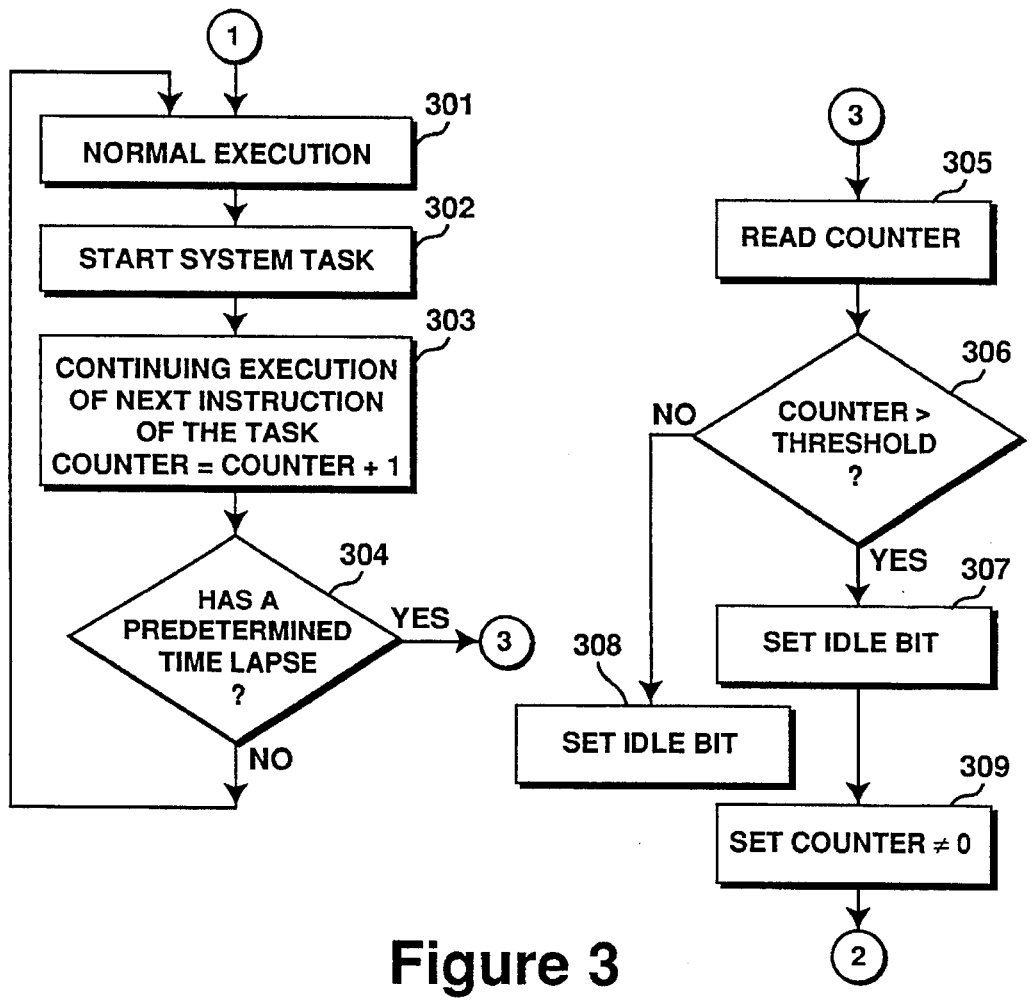
FIG. 3 is a flow chart that shows the process of determining the inactive state of the processor.
Figure 4:
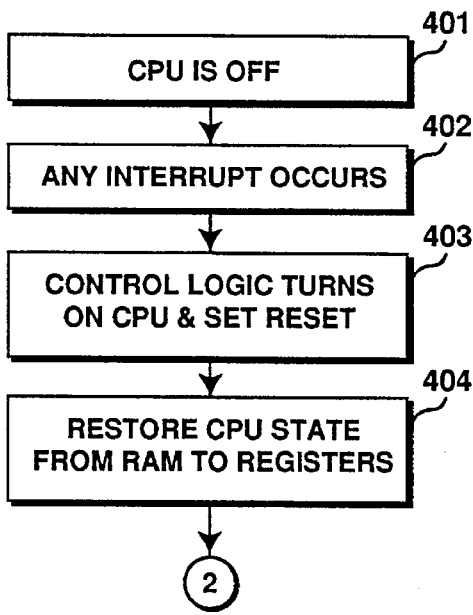
FIG. 4 is a flow chart that shows the process of generating the power off signal when the processor is being turned onto power.

The process of the software mechanism incorporated into the operating system for determining the operating state of processor 12 and generating the power cycle signaling to remove power and clock signals supplied on processor 12 is shown in the flowchart diagrams of FIG. 2–4.

FIG. 2 is the flow chart illustrating the process of generating the power off signal to decoder 9 from which the power cycle initiation signal is derived. In FIG. 2, the process is invoked each time processor 12 is at the power-on state for normal processing as at step 201. When an interrupt occurs to processor 12 on lines 52 as indicated at step 202, processor 12 is set to interrupt its current processing and execute a conventional interrupt routine at step 203. At step 203, if the interrupt is determined to be a regular interrupt, the idle bit will be cleared (indicating that the processor is not idle). At step 204, peripheral devices are polled (especially the disk driver) and the idle bit is cleared if the polling finds that the status of a polled device is changed. This is done through polling buffer 40 in I/O interface unit 14 of FIG. 1. In step 205, the operating system determines whether processor 12 is currently actively processing or is in an inactive state by checking whether the idle bit is set. If not, it means that processor 12 is still actively processing and should resume the normal processing operation at step 210. The process will then exit to node 1 for subroutine 1 (shown in FIG. 3). If it is found at step 205 that the idle bit is true, the operating system then checks at steps 206 and 207 whether user input and/or output has happened in the last two seconds or whether the cursor is one of the "wait" cursors (e.g., a watch or hourglass). This is accomplished by having a storage location in memory which stores the current status of the cursor. The storage location is checked and the data is read out by processor 12. For example, if the value stored in the storage location is one of the values indicating it is a watch cursor, then the cursor is determined to be a watch cursor.

If either of these two conditions is satisfied, processor 12 resumes its normal processor operation to handle the user input and/or output and the process exits to node 1 for subroutine 1. If not, it means processor 12 is indeed in an inactive state and there is no user input and/or output. The operating system then stores the status of processor 12 from the registers of the processor 12 to RAM 13a at step 208 in order to preserve the state of the processor while it is off. This is done by reading the contents in the known registers in processor 12 and then writing those contents into known locations in RAM 13a by known (e.g., conventional) programming means. At step 209, the operating system issues the power off signal through address bus 25 and data bus 27 to initiate the sequence which terminates the power supply to processor 12.

The flow chart of FIG. 3 shows the subroutine 1. It illustrates the process of determining when processor 12 is not actively processing and, therefore, setting the idle bit (at node 3). In FIG. 3, following node 1, step 301 indicates that the operating system is in the state of normal execution of programs, which also typically includes handling of non-VBL interrupts (e.g., the user is typing on the keyboard). At step 302, the operating system starts a task which is typically started by the user, such as a program running on processor 12. At step 303, the operating system continues its execution of the program and the software of the present invention increments a counter by the operation of "COUNTER= COUNTER+1". The status of this counter will determine (via subroutine 3) whether the idle bit will be set. Step 304 is accomplished by instantly responding to the periodic VBL interrupt signal. The predetermined time in step 304 coincides with the frequency of the periodic VBL interrupt signal, which happens at every 1/60th of a second. It will be noted that the counter used for the idle bit is not related to the periodic interrupt. At step 304, if the predetermined time has not lapsed (i.e. the VBL interrupt has not occurred), the operating system goes back to step 301 for normal execution. If the predetermined time has occurred, the operating system goes to node 3 to check the status of processor 12. Following node 3 are the steps 305–309. Steps 305–309 together show the process of determining the status of processor 12 and the setting of idle bit for processor 12. The contents of the counter is read out at step 305 and compared with a threshold at step 306 to determine whether processor 12 is actively processing or staying in an inactive state. The threshold is an integer value which is set so that the processor is turned off if the counter exceeds it (i.e., the processor increments the count enough to indicate that it is spending a relatively smaller portion of its time executing tasks and a larger portion of its time looping through FIG. 3 incrementing the counter). In a typical embodiment, the value of the threshold will be the number of counts which is equivalent (given the system clock rate at which the counter is incremented) to 0.5 seconds. If the content of the counter is not greater than the threshold, which means processor 12 is in its active state for processing, the operating system goes to step 308 to clear the idle bit whether it has been set or not. If the content of the counter is determined to be greater than the threshold in step 306, the operating system then goes to step 307 to set the idle bit for processor 12. This indicates processor 12 is not actively processing. At step 309, the counter is cleared to zero in order to start with a new cycle. The operating system then goes back to node 2 in FIG. 2 for further execution.

FIG. 4 is a flow chart illustrating the process of providing power and clocking signals to processor 12 when processor 12 has been powered off. In FIG. 4, unlike the process shown in FIG. 2, the process is invoked each time processor 12 is being powered on. Step 401 indicates that processor 12 has been previously powered off by control logic circuit 11 under the power off signal issued by the operating system at step 209 in FIG. 2. Processor 12 remains in its off state until an interrupt occurs at step 402. The interrupt, which may be either the periodic interrupt or may be an interrupt generated by a user input, causes control logic circuit 11 to allow the clock signals to processor 12, as well as turn on the power supply to processor 12 and asserts the reset signal to the reset pin of processor 12 at step 403 (reset is active low). As processor 12 is turned on by control logic circuit 11 at step 403, the operating system starts its operation at step 404 to restore processor state from RAM 13a to the registers of the processor and goes to node 2 of FIG. 2 for executing the conventional interrupt routine at step 203. The step of restoring the registers is performed in a routine manner by using known reading means (or commands) to read the information from the known locations in the RAM 13a to the known registers in processor 12. It then checks the idle bit at step 205 to determine the status of processor 12. As described above in FIG. 2, if processor 12 is requested to resume normal operation, the operating system will then go to step 210 to resume the normal operation. If processor 12 remains inactive and no user input and output has been requested or conducted and the polling does not show any status change to the polled devices, the operating system will again issue the power off signal to turn off processor 12 again at step 209. The ON/OFF process is repeated until the operating system determines that processor 12 should resume its normal operation. Processor 12 is then powered on and clock signals resumed for its normal operation until the operating system once more determines that processor 12 is in an inactive state and generates the power off signal to turn off processor 12.

Figure 5:
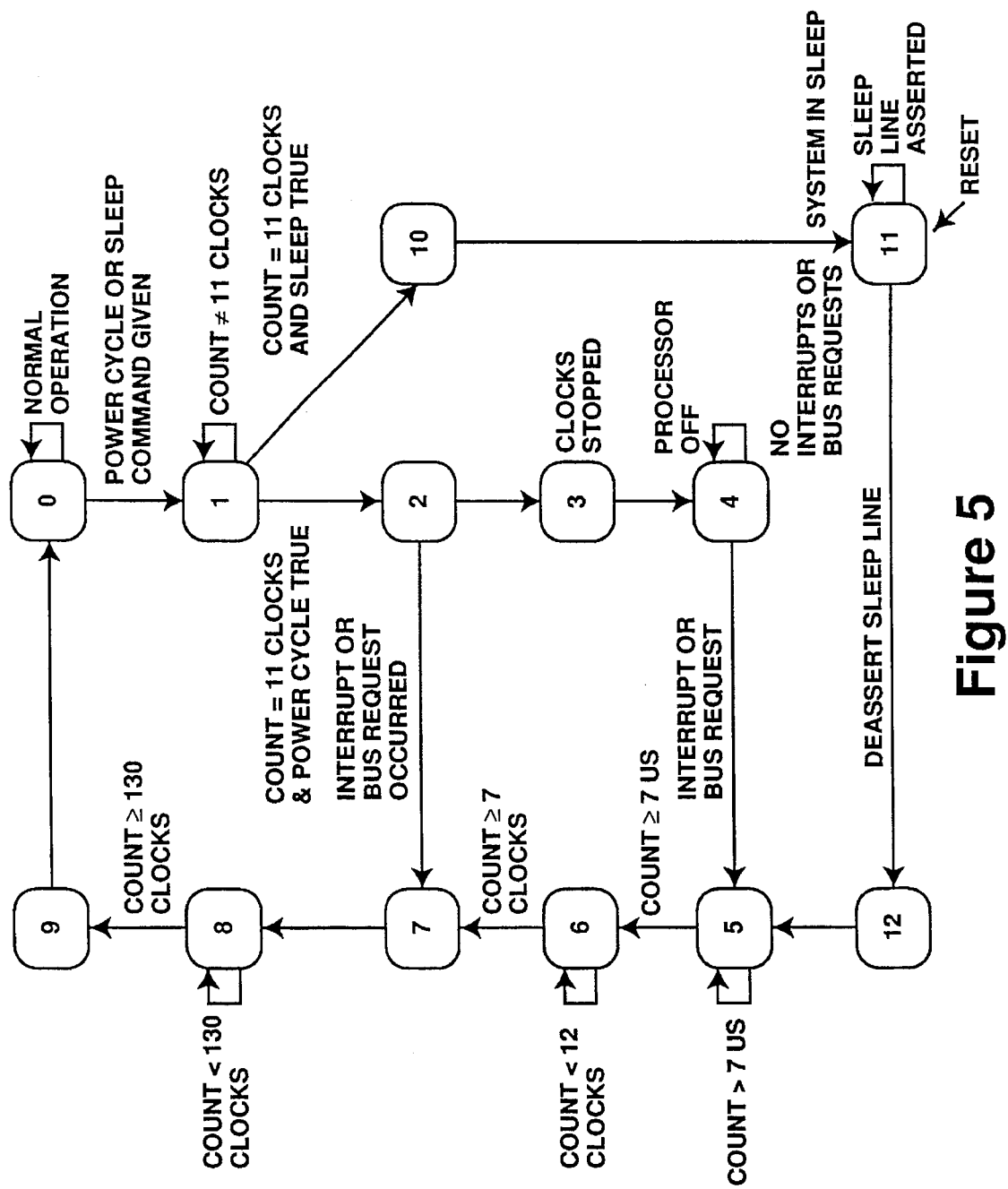
FIG. 5 is a state transition diagram for the control logic circuit of the bus translator and controller.

FIG. 5 is the control logic state diagram of the power cycling, including the sleep modes of the processor of the present invention. States 4–9 and 0 correspond to states 401–404 of FIG. 4. States 0–4 are an expansion of state 209 of FIG. 2. In state 0, the processor is in normal operation. A decision is made as to whether to enter power cycling, where only the processor is turned off, or to enter into the sleep mode, where much of the computer system is turned off, in either case to create a reduced power consumption state.

Once a decision is made to enter the power cycling or the sleep state, the processor transitions into state 1, where the reset signal 34 is asserted. Also during states 1–9, the bus translator 7 disqualifies (e.g., ignores) any bus cycle initiation signals from the processor 12 to the bus translator 7 to prevent spurious actions of the bus translator 7 since the output of processor 12 is not valid when in reset. In the preferred embodiment, the bus cycle initiation signal is ignored until the processor 12 transitions back into state 0. The bus translator 7 also deasserts bus initiation signals to the I/O subsystem to prevent spurious activity from occurring in the I/O subsystem as well. These signals are deasserted in all other states until returning to state 0.

While these operations are occurring, the processor clocks are counted. After a predetermined number of clock pulses, the control logic circuit 11 transitions to state 2. In one embodiment, the number of clock pulses counted before transitioning is 11. However, the number of clock pulses is a design choice and may be any number of clocks sufficient in duration to guarantee that the processor has been fully "reset", according to its operational specifications. The counting of processor clock signal pulses occurs in parallel with the other tasks performed during state 1 and the number used is also selected to ensure the completion of these tasks.

The power cycling mode is entered when software writes to register 8 in the bus translator 7. Register 8 may be accessed from either software running on processor 12 or software running in the I/O subsystem (e.g., on an expansion card) containing a processor and other operating system. The control logic circuit 11 determines whether the system is going to power cycling mode or sleep mode by reading the contents of register 8. If power cycling mode is to be entered and 11 BCLK clock signal pulses have occurred, then the state machine transitions to state 2. On the other hand, if the sleep mode is to be entered, then the state machine transitions to state 10. A distinction between transitioning to state 10 and entering the sleep mode versus transitioning to state 2 and entering power cycling mode is that in the sleep mode, the RAM 13a will subsequently be configured for a low power self-refresh mode.

Assuming that the power cycling mode is to be entered, state 2 is the last opportunity for an interrupt or bus request to occur prior to powering off the processor 12 as part of the power cycling mode. If an interrupt or bus request occurs while in or prior to state 2, the state machine transitions to state 7. This allows the process of shutting off the processor 12 to be bypassed to reduce the latency when leaving the process. If an interrupt or bus request does not occur while in or prior to state 2, then the state machine transitions to state 3.

In state 3, the clocks to the processor 12 are stopped in a low state. In the preferred embodiment, the clocks to the processor are stopped by asserting the PLL mask signal 50.

The PLL mask signal 50 is active low. The PLL mask signal 50 is received on a pin of the PLL 6 and causes the clock signals to the processor 12 to be masked. Both the PCLK and the BCLK signals are stopped in the low state. In the preferred embodiment, PLL 6 comprises a MC88920 Low Skew CMOS PLL Clock Driver manufactured by Motorola Corporation of Schamburg, Ill. and the PLL mask signal 50 is received on its MR line, which is active low. This PLL device is special in that it allows a few clocks to be disabled (e.g., CPU clocks) without losing the internal PLL lock condition; meanwhile, it does not disable other clocks, such as, for instance, those clock signals that go to the bus translator 7. By maintaining the internal lock condition of the PLL, latency associated with achieving PLL lock when re-enabling the clocks is avoided, so that the processor may still adequately return from power cycles in a timely fashion to service tasks or interrupts The clocks are stopped to prevent a latch up condition from occurring as a result of powering down the processor with inputs driven high by external devices such as by the PLL 6. Note that the bus translator 7 continues to receive a valid and separate BCLK clock signal from PLL 6 throughout power cycles to the processor 12.

After turning off the clocks, the state machine transitions to state 4 where the power to the processor 12 is turned off. In the preferred embodiment, the power signal 51 is driven high (deasserted), causing switch 23 (typically, a p-channel transistor) to turn off. When the switch 23 is off, power to the processor 12 is disabled. Also during state 4, the address bus 25, data bus 27 and control lines 54 are driven low, or tri-stated. By tri-stating these buses, energy will not be driven inadvertently into the processor 12 from bus translator 7. At this time, the processor 12 is in the powered off state; however, the I/O portion of the system is still running and the display 16 remains updated.

The state machine remains in state 4 until an interrupt, a bus request or the periodic event (e.g., timer interrupt) on lines 29 occurs. Bus requests are included as a valid wakeup source since only the processor 12 can grant the bus and access to main memory to other bus masters. The processor 12 must be powered on to grant the bus; otherwise, the data lines to memory to which the processor is coupled would be loaded down by the processor in the "off" condition.

Upon detection of an interrupt or bus request, the state machine transitions to state 5. Once in state 5, a count to seven microseconds is initiated. During state 5, the power signal 51 is asserted, triggering switch 23 to turn on and provide power to the processor 12. At this point, the processor 12 is under reset. The seven microseconds allows the power plane on which the processor 12 sits to arrive at a stable voltage of 5 volts. This stabilization time may be increased or reduced to account for bypass and other capacitance on the processor power plane that needs to be charged. In this embodiment, the bypass capacitance is limited to less than 1 µF so that 7 µsec is more than adequate delay. Note that during state 5, the processor address (25), data (27) and control (54) signals, with the exception of the encoded interrupts and bus requests on lines 52 and the clock signal lines remain tri-stated by the bus translator 7.

After the seven microseconds, the state machine transitions to state 6, where the PCLK and the BCLK clock signals to the processor 12 are no longer masked. This is accomplished by the bus translator 7 deasserting the PLL mask signal 50. In state 6, the processor 12 remains in reset, as the reset signal via line 34 is still asserted. During the reset, the bus translator 7 maintains the encoded interrupts and bus requests 52 in the tristated state. A counter counts 12 clock cycles using the BCLK clock signal as a reference. This 12 clock cycles may be any number of clock cycles sufficient to guarantee the processor 12 is fully reset.

After 12 clock cycles, the state machine transitions to state 7, where the reset signal 34 is driven high to cause the processor 12 to exit the reset mode. Also the bus cycle initiation signal is deasserted and tristated by the bus translator 7. Also in state 7, the relevant encoded interrupt lines or bus request lines are driven low while the other interrupt and bus request lines are negated (de-asserted). Also the bus cycle initiation and bus grant signals that are a part of the control signals being sent from the bus translator 7 to the I/O interface unit 14 continue to be disabled.

State 8 is a transitional state following state 7. In the current embodiment, a counter counts 130 BCLK clock signal pulses before transitioning to state 9. These 130 clock cycles are specific to the requirements of processor 12 for coming out of the reset condition. Some processors, such as the one used in this embodiment, will not be ready for performing its first external bus cycles until some number of clock cycles has elapsed (in this case 130). Two extra clock cycles provide for the state 9 and state 0 transitions to occur. The purpose of waiting out the 130 clock reset period in state 8 is to continue ignoring invalid bus cycle initiation signals until the processor is known to be out of reset and can drive valid bus signals.

In state 9, the bus cycle initiation signal is tri-stated by the bus translator 7, while the bus grant and address strobe signals are driven normally on the I/O portion of the computer system. The power cycle bit in register 8 is cleared so that the state machine does not cycle again from 0 to 1 until software writes to the power cycle bit again. The decoder 9 sends the control logic a power cycle initiation signal which is generated in response to the power cycle register bit set by the operating system when it is ready to power cycle. Thereafter, the state machine transitions into state 0, where normal operations begins. Recall that during states 1–9, the control logic circuit 11 and decoder 9 do not pay attention to any processor driven address or bus cycle initiation control signals.

If the bus translator 7 determined that sleep mode is to be entered when in state 1, the state machine transitions to state 10 after 11 BCLK clock signal pulses. In state 10, the RAM 13a is configured for self-refresh mode, such that refresh operation does not require external re-initiation by bus translator 7. Any memory map configuration registers or other registers that software may need to have reset or configured before software returns from being powered down are configured at this time. For example, in the currently preferred embodiment, the operating system software prefers to wake by having the processor 12 fetch the reset vector from ROM 13b and execute a number of instructions from ROM 13b before transitioning to RAM 13a. A ROM overlay bit is reset to re-map ROM space to "zero page" in memory where the processor 12 accesses the reset vector. After the processor 12 has powered on and fetched the reset vector and some instructions from ROM 13b, the operating system transitions to RAM 13a at "zero page" by setting the ROM overlay bit. This ROM overlay bit is specific to this embodiment and this operating system; it is described merely as an example of the type of registers which may need configuring during power down.

Once state 10 has been completed, the state machine transitions to state 11 where the computer system powers down and remains waiting for the sleep signal or the reset signal to be deasserted. In state 11, the osc_power signal 60 is deasserted by controller 17 so that switch 26 is turned off, removing power to oscillator 24, PLL 6, switch 23 (therefore processor 12), and any other devices which can be powered down in a low power sleep mode while maintaining basic computer and RAM state (e.g., processor state). Also, shortly after this time, the sleep signal 61 from controller 17 is asserted, as described with reference to FIG. 6. In this idle state, the input clocks are gated because they become unstable until the sleep signal is deasserted.

When the sleep signal is deasserted, the stable clocks are allowed to propagate through and the state machine transitions to state 12. In state 12, the stable clocks are allowed to propagate to sequential logic and the DRAM 13a is brought out of self-refresh state. The state machine then transitions to state 5, where the processor 12 undergoes the power up process leading to normal operation as described above.

Note that the bus translator 7 does not receive the BCLK clock signal during sleep mode cycles. Therefore, it has responsibility for stopping its own clocks without glitches or hazards (such as runt pulses) when the sleep signal is received, and start its own clock without glitches when the sleep signal is deasserted (which will indicate clocks are stable).

Note that by state 12, the clocks to bus translator 7 have already been stabilized. States continuing from 12 to 5 to 6 to 7–9 and 0 are as described earlier for exiting the sleep condition (i.e., same as exiting the processor power cycle condition for these states).

Figure 6:
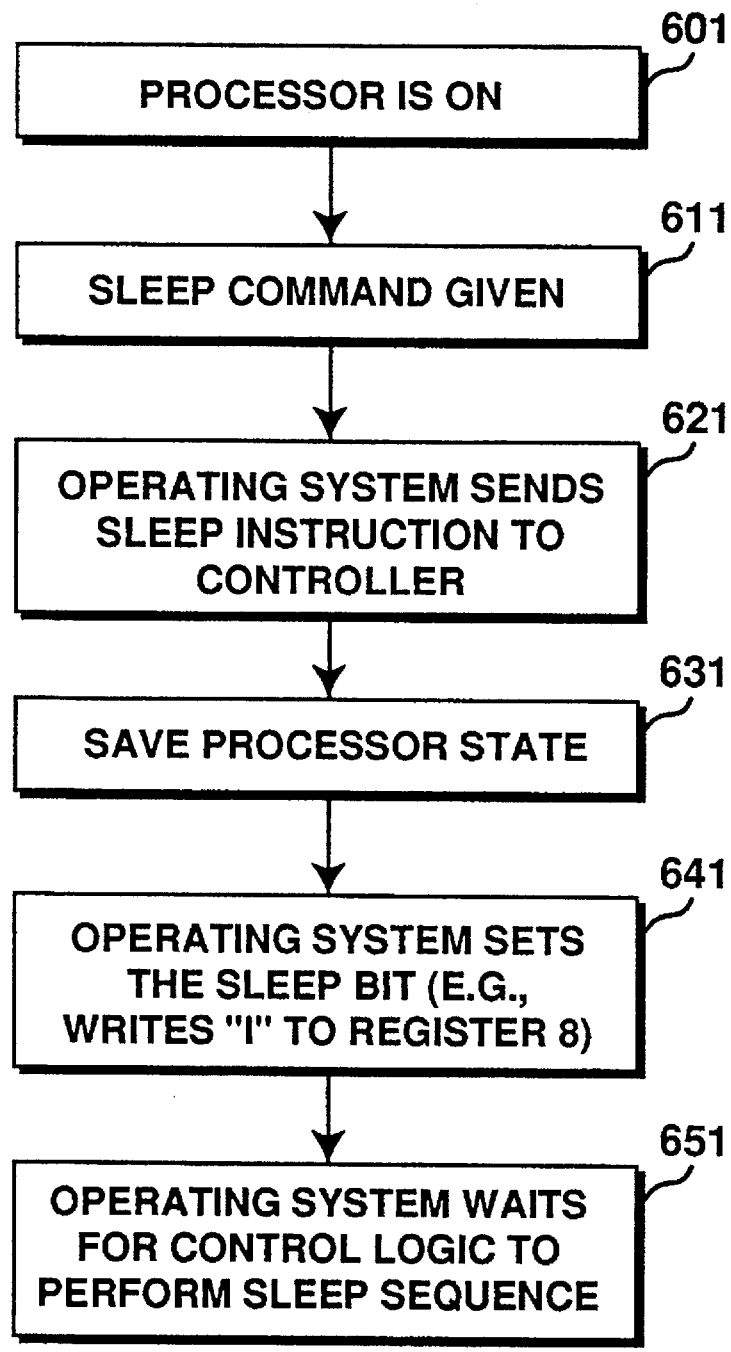
FIG. 6 is a flow diagram depicting the process for entering sleep mode.

FIG. 6 illustrates the process of the present invention for entering sleep mode. Initially, the processor 12 is powered on (processing block 601). A sleep command is then given (processing block 611). The sleep command could be given by the user (e.g., selecting a menu item on the display), generated in response to low battery capacity, or due to a system idle clock timeout.

After the sleep command has been given, processing continues at processing block 621 where the operating system provides a sleep instruction to the controller 17. The sleep instructions originates from processor 12 and is sent to controller 17 via the bus translator 7 and I/O interface 14. Note that the sleep instruction is not the same instruction or command given to set the register 8 sleep bit of the bus translator 7 to initiate the sleep sequence of the control logic 11.

Once the operating system gives the sleep instruction to the controller 17, the sleep sequence begins. However, controller 17 will wait 100 μs before performing the sleep steps of deasserting the osc_power signal 60 and asserting sleep signal 61. This allows the operating system to perform processing blocks 631 and 641 first. The processor state is saved from registers into RAM 13a (processing block 631) and the operating system writes a "1" to the sleep bit in register 8 of the bus translator 7 (processing block 641).

In response to the sleep bit being set, the control logic 11 performs the sleep sequence, causing the state machine (FIG. 5) to transition from states 0 to 1 to 10 and then to state 11 (processing block 651), where the "sleep" state is entered. Controller 17 then deasserts the osc_power signal 60, which removes power from oscillator 24, PLL 6, switch 23 and thus processor 12 as mentioned earlier. Therefore, the processor 12 is turned off from the I/O portion when transitioning to the low power consumption sleep mode.

Figure 7:
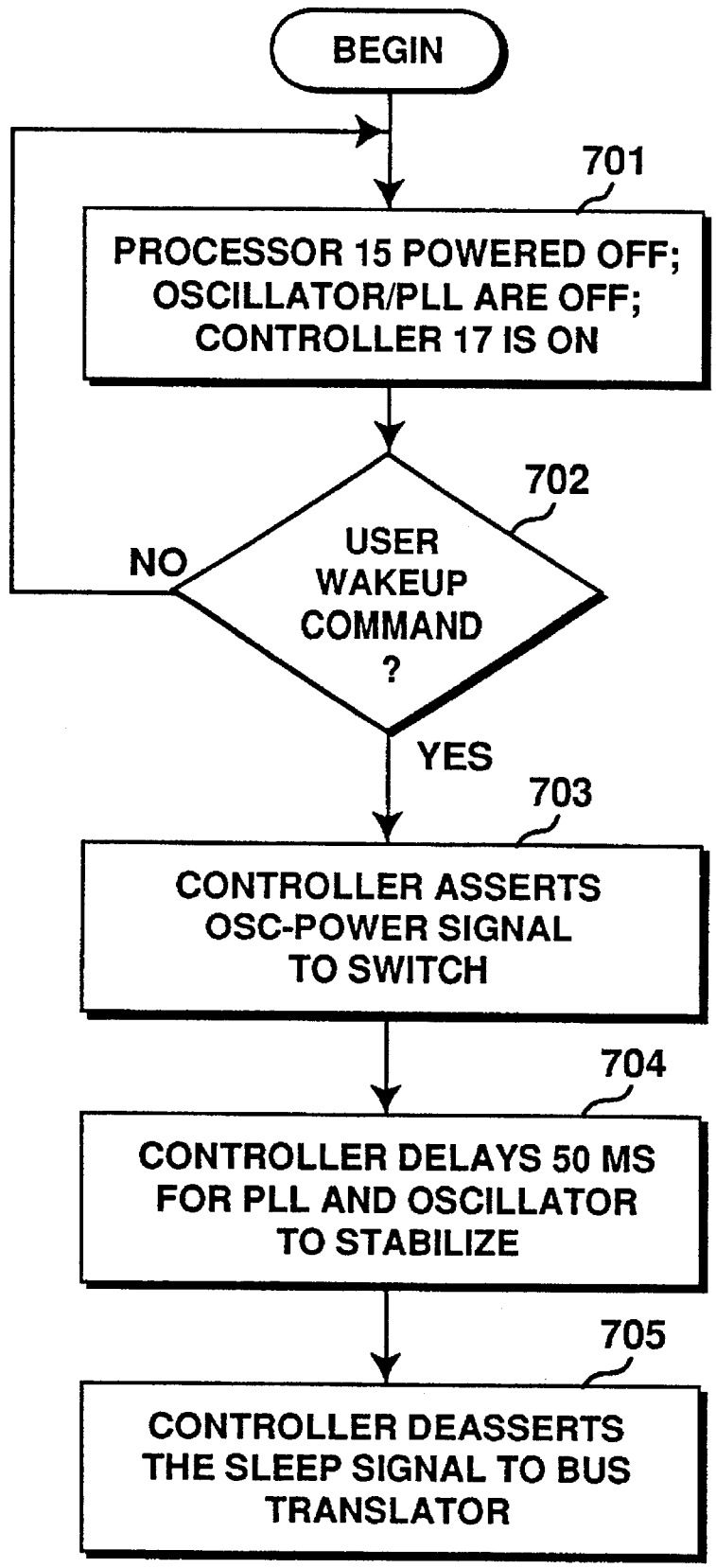
FIG. 7 is a flow diagram depicting the process for exiting sleep mode according to the present invention.

FIG. 7 illustrates the process for exiting the sleep mode as initiated by the controller 17. The processor 12 is powered off along with the oscillator 24 and PLL 6. Controller 17, on the other hand, is powered on (processing block 701). A test determines if a user wake-up command has been received, such as a key being depressed (processing block 702). If not, processing continues at processing block 701. However, if a wake-up command has been received, then processing continues at processing block 703 where the controller 17 turns on the power to oscillator 24 by asserting the osc_power signal 60 to switch 26. The controller 17 pauses so as to allow the PLL 6 and the oscillator 24 to stabilize (processing block 704). Controller 17 then desserts the sleep signal 61 to the bus translator 7, causing the power up process to continue at state 12 of the control logic flow (processing block 705).

Figure 8:
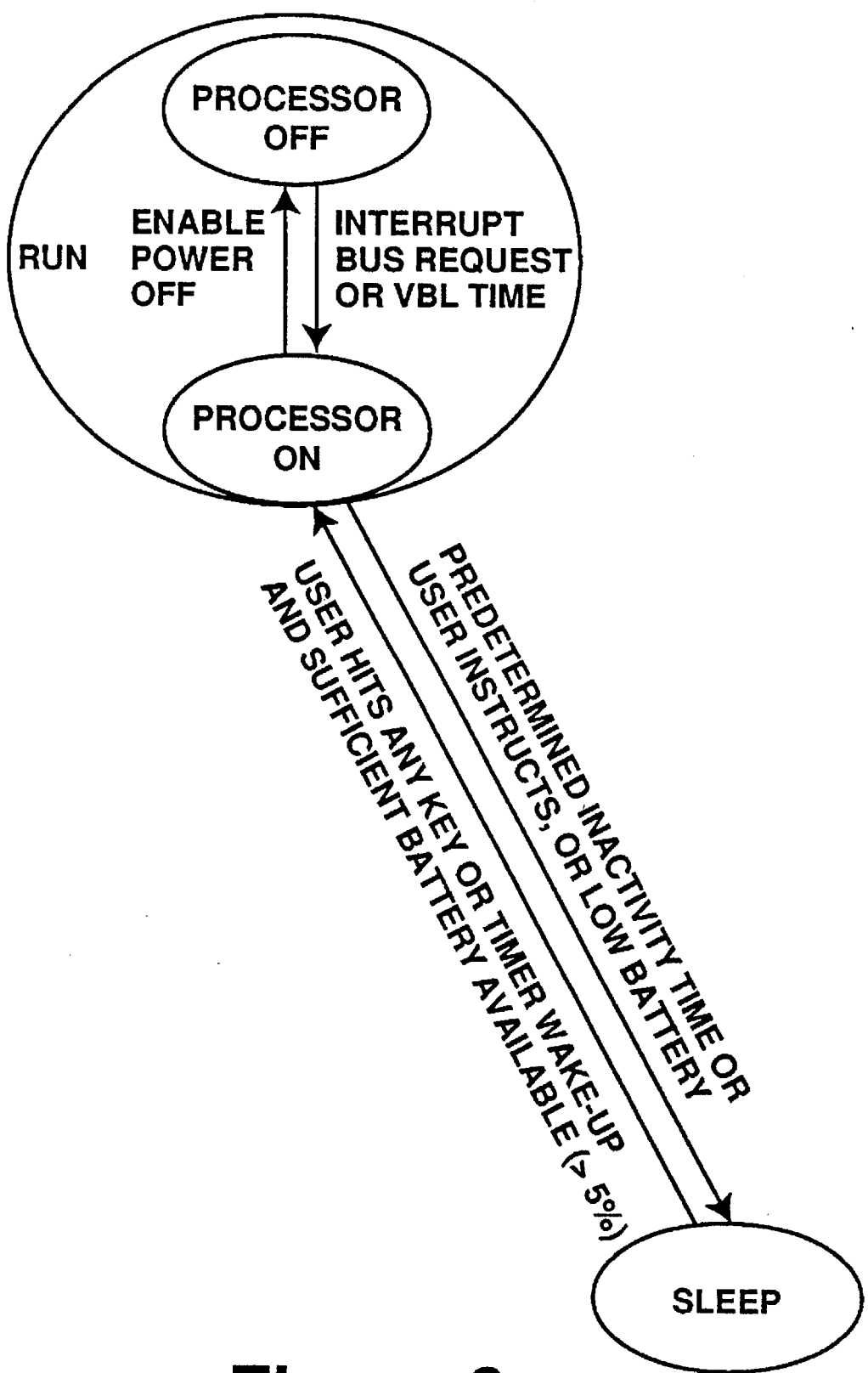
FIG. 8 illustrates the operating modes of the computer system of the present invention.

Thus, the operating system running on processor 12 is responsible for initializing the sleep mode by first giving a command to the controller 17 and then to the sleep bit in register 8 of the bus translator 7, whereas the firmware running on controller 17 is responsible for initiating the sleep mode exit. FIG. 8 summarizes the powered states of the computer system.

Figure 9:
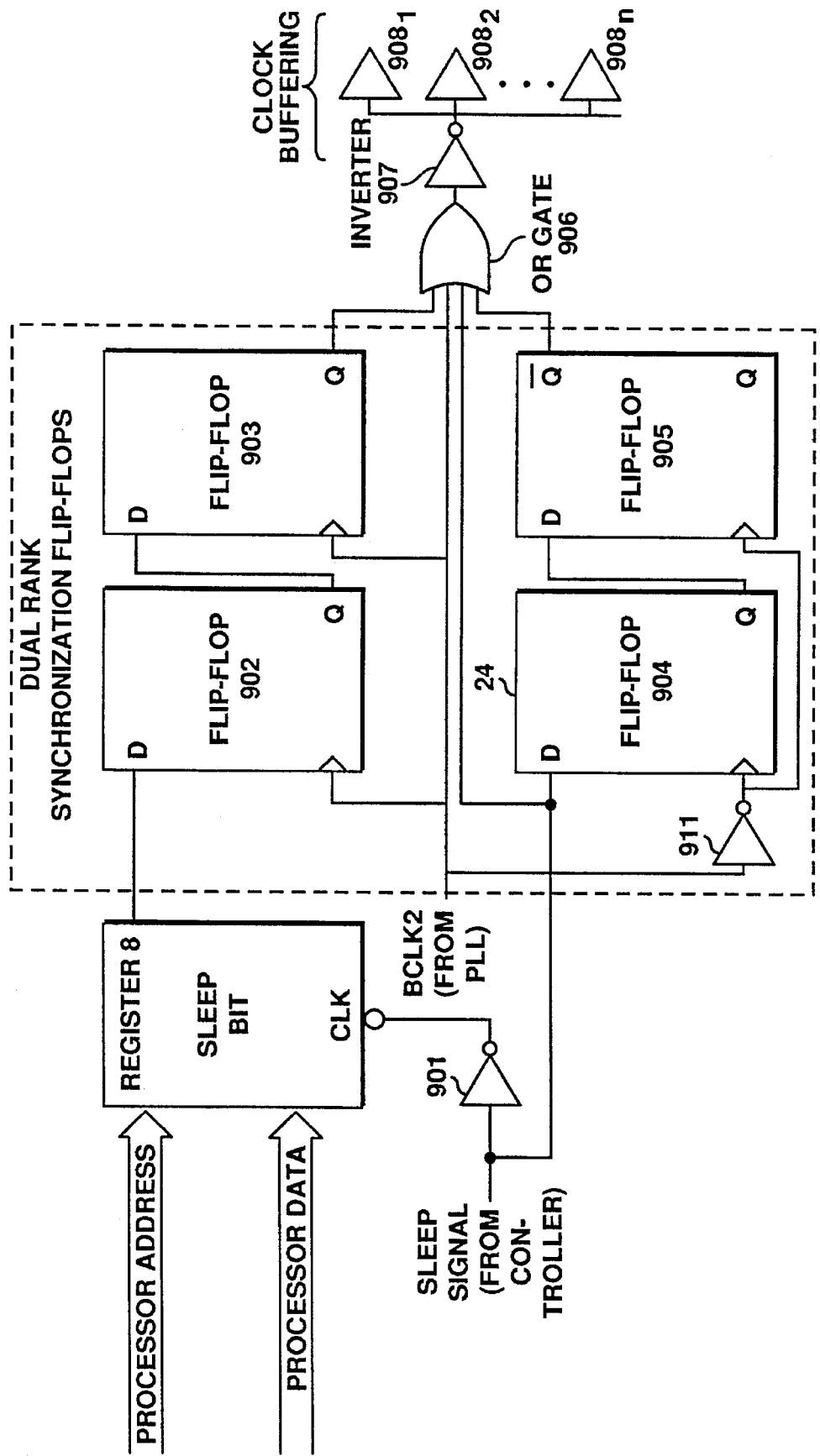
FIG. 9 is one embodiment of the clock stopping/starting circuit of the present invention.

FIG. 9 illustrates one embodiment of the clock stopping/starting circuit of the present invention. The circuit starts and stops the clock signals and bus translator 7 clocks without hazards. Referring to FIG. 9, the sleep bit of register 8 is shown accessible through the processor address bus 25 and data bus 27. A clear (CLR) input to the sleep bit is coupled to the sleep signal from the controller 17 via an inverter 901. The sleep signal from controller 17 is also shown coupled to the D input of flip-flop 904 of the dual rank synchronization flip-flops. The Q output of flip-flop 904 is coupled to the D input flip-flop 905. The Q output of flip-flop 905 is coupled to one input of OR gate 906. The D input of flip-flop 902 is coupled to the sleep bit. The Q output of flip-flop 902 is coupled to the D input of flip-flop 903. The Q output of flip-flop 903 is coupled to another input of OR gate 906. Flip-flops 902 and 903 are clocked by the BCLK signal (BCLK 2) from PLL 6, while flip-flops 904 and 905 are clocked by the inverted version of the BCLK signal (via inverter 911). OR gate 906 also receives the BCLK signal and the sleep signal. The output of OR gate 906 is coupled to an input of inverter 907. The output of inverter 907 is coupled to buffers $908_{1-n}$ that buffers the clock to the sequential logic.

Figure 10:
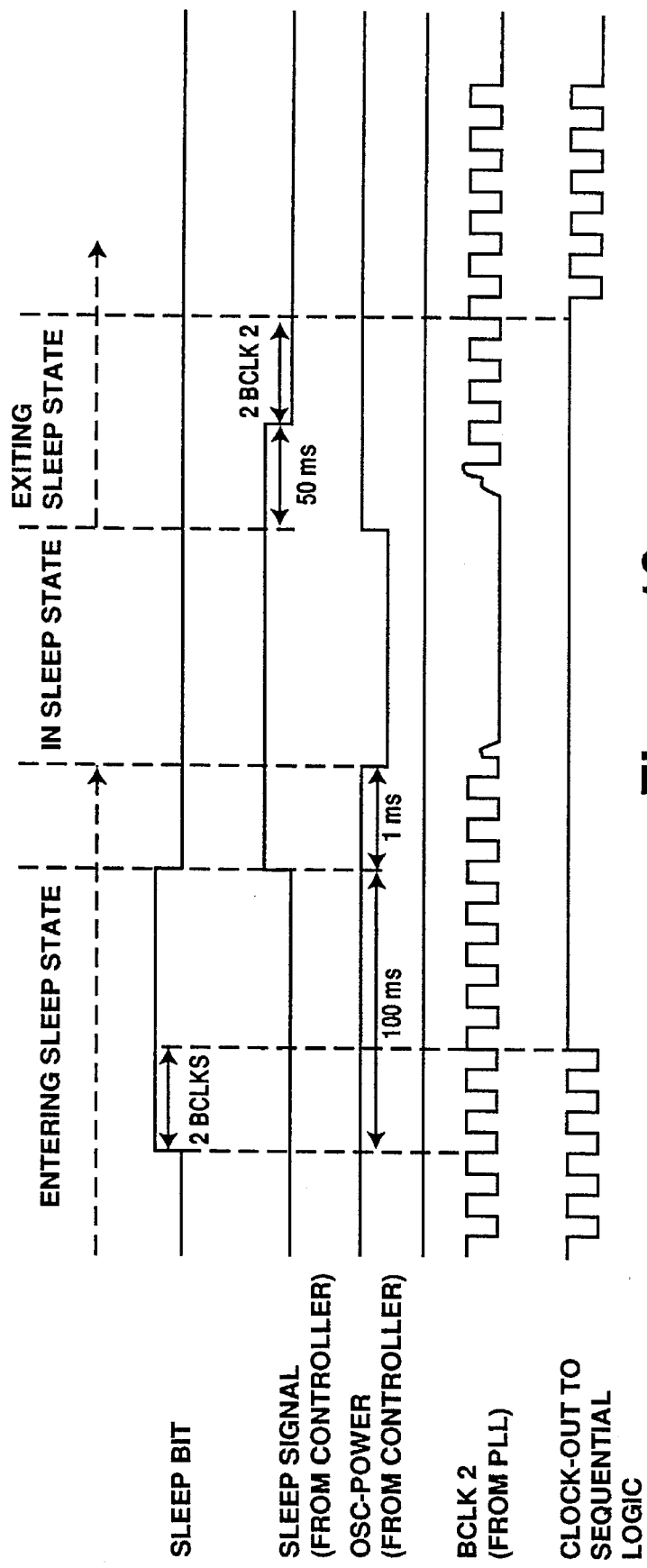
FIG. 10 is a waveform diagram of the clock stopping/starting process of the present invention.

The operation of the circuit in FIG. 9 is described with references to the waveform diagram of FIG. 10. Referring to FIG. 10, the sleep bit in register 8 is set in response to an access by processor 12. After 2 BCLK clock signal pulses, the clock output from buffers $908_{1-n}$ becomes high. After 100 μs from the setting of the sleep bit, the sleep signal from the controller 17 becomes high. Approximately 1 μs after the sleep signal is asserted, the osc_power signal 60 becomes low and the BCLK signals to bus translator 7 are disabled, such that the sleep state is entered.

When exiting the sleep state, the osc_power signal 60 is asserted by controller 17 and the BCLK signals (BCLK2 signal) from PLL 6 are started. After approximately a 50 ms delay, the sleep signal from controller 17 is deasserted. After 2 BCLK signal pulses later, the clock output from control logic 11 is output again. In this manner, the clocks may be started and stopped without hazards.

Figure 11:
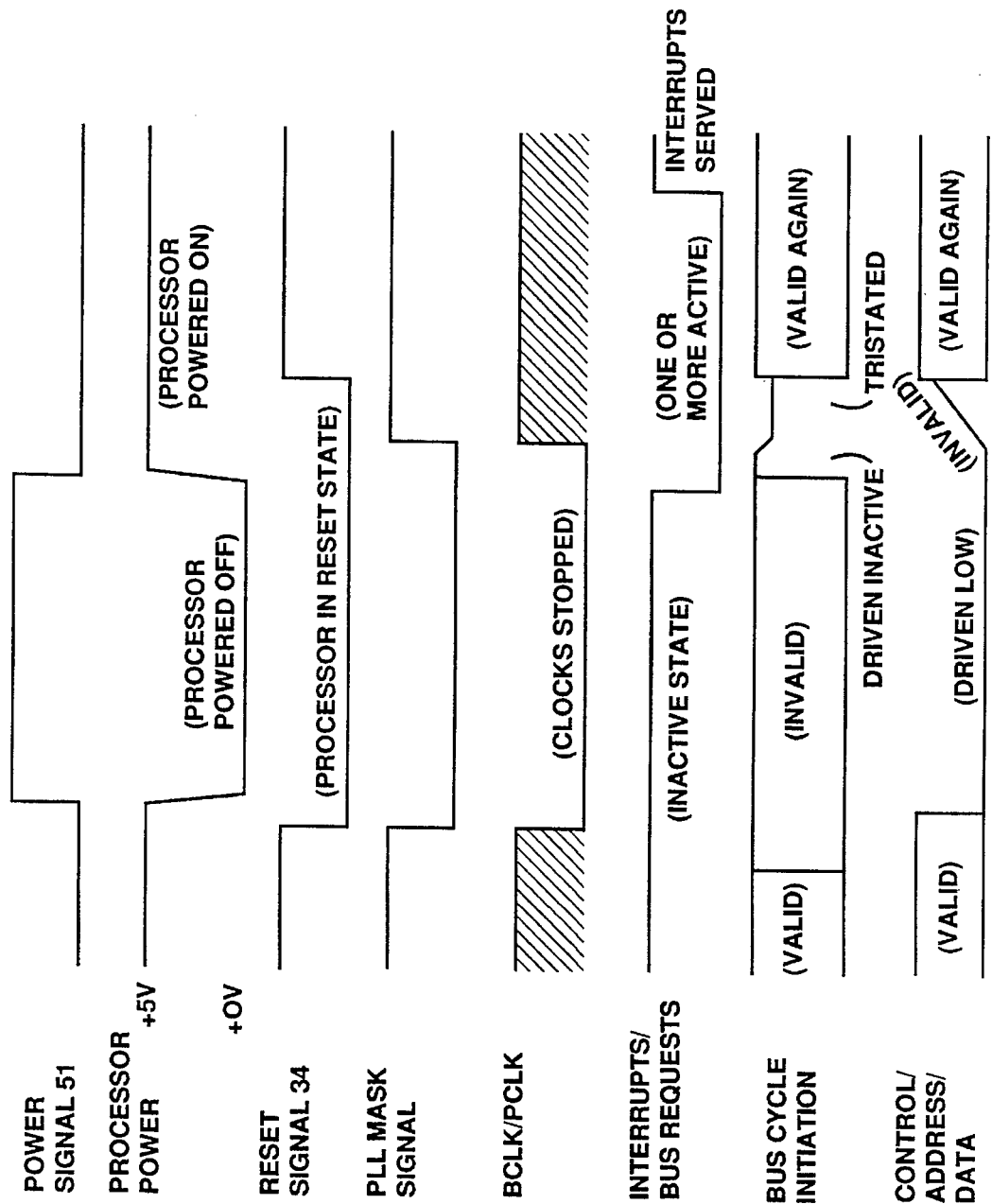
FIG. 11 is a timing diagram depicting the power cycling of the present invention.

FIG. 11 is a diagram illustrating the waveforms of the power cycling of the present invention. Referring to FIG. 11, the state of power signal 51, the processor power, the reset signal 34 to the processor 12, the PLL mask signal 50, the BCLK and PCLK clock signals, the interrupt and bus request lines, the bus cycle initiation signal, and the control, address and data lines are shown. As the processor 12 enters power cycling mode, the BCLK and PCLK signals are stopped and the reset signal 34 becomes low placing the processor 12 in reset. Once this occurs, the ramp-down time to the processor 12 occurs. That is, approximately 1–1.5 microseconds after the clocks have been driven low (stopped), the power signal 51 becomes high, such that the processor 12 shows nearly zero volts on its $V_{DD}$ input. The inputs to the processor 12, such as control lines, are driven low during the power off periods. Typically, after approximately 15 milliseconds (the next VBL timer interrupt), the power signal 51 is asserted (e.g., becomes low), causing the processor 12 to power-up. The power-up 5V ramp time is about 3–5 microseconds if the bypass capacitance on the processor $V_{DD}$ pins is kept below 1 µF. The BCLK and PCLK clock signals are unmasked, such that they are valid and running 2–3 microseconds after the 5V is stable. The reset signal 34 is deasserted 12 clocks after the BCLK and PCLK clock signals and 5V are all stable, or 2–3 microseconds plus 12 clocks after the 5V are stable. The operational period is very short, approximately 1–1.5 milliseconds before power is turned off again. In the preferred embodiment, this cycle repeats every 16.6 milliseconds (60 Hz).

FIG. 11 also shows that interrupt and bus request lines from the I/O subsection. These lines are shown as being not asserted during most of the power off period. However, one or more of these becomes active near the end of the processor power-off period, causing the power-on of the processor. Since the VBL interrupt (or 60 Hz timer interrupt) is encoded on these lines, an interrupt is always present upon power-on after processor power cycle, even if it is simply due to the VBL timer.

A bus request would be handled in the same way for powering on the processor 12. Instead of servicing an interrupt in this case, the processor 12 initially grants the bus to the other master device or processor requesting it. In such a scenario, the alternate bus master could keep putting the processor 12 into power cycle mode, only powering it on when it required use of the bus of processor 12 for accessing it or RAM 13a or ROM 13b. For an expansion card consisting of an alternate processor with its own local bus subsystem including RAM and ROM, it may be a preferred power saving measure to keep the processor 12 powered off as much as possible since only rarely would the alternative processor in this case need access to the subsystem of processor 12. Therefore, the present invention allows an alternate processor, possible running an alternate operating system, to control the computer system, while avoiding the penalty of a shorter battery life by having the alternate processor turn off the processor 12.

In sum, the present invention provides a technique for reducing power consumption in a computer system, particularly by reducing power consumption by a processor and by incorporating a method to enter and exit a low power sleep mode. The present invention controls power to the processor, such that the power is off when the processor is not actively processing software. The processor power down may be initiated from an operating system running on it, from an operating system running in an expansion card based processor or initiated by firmware from a microcontroller connected through the I/O section of the computer system. The power to the processor is resumed when a periodic interrupt or a bus request occurs.

The powering down of the processor in the present invention includes preventing the processor from being clocked. The clocks to the processor are disabled, yet can be enabled instantly even though the clocking source is a PLL. By cycling power to the processor, power consumption is reduced and battery life extended. By turning off power to the oscillators and unused portions of the computer in sleep mode, more power may be saved.

In the foregoing specification the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

We claim:

1. A computer system comprising:

a processor running a programming structure, wherein the programming structure determines when the processor is in an inactive state using periodic task scheduling and outputs an idle indication in response to determining that the processor is in the inactive state;

a phase-locked loop (PLL) coupled to supply clocking signals to the processor, wherein the PLL comprises maskable outputs that allow output of the clocking signals to the processor when unmasked and prevent output of the clocking signals when masked, and further wherein the PLL maintains synchronization in a locked state when the maskable outputs are masked a power supply that supplies power to the processor;

a switch coupled to the power supply and the processor, wherein the switch couples the power supply to the processor when the switch is on and decouples the power supply to the processor when the switch is off;

a timer coupled to provide a periodic interrupt signal at a predetermined interval to the processor; and a controller coupled to the processor, the switch and the PLL to place the processor in a reduced power consumption state, wherein the controller, in response to the idle indication, causes masking of the maskable outputs of the PLL to prevent the processor from receiving the clocking signals and turns the switch off to prevent the processor from receiving power, and further wherein the controller, responsive to either a bus request from an alternate bus master, the periodic interrupt signal or an interrupt, causes unmasking of the maskable outputs and turns switch on, thereby causing the processor to exit the reduced power consumption state until such time as the processor outputs the idle indication again.

2. The computer system defined in claim 1 further comprising abort logic, responsive to interrupts and bus requests that occur subsequent to the controller receiving and beginning to respond to the indication, to prevent the processor from entering the reduced power consumption state when at least one interrupt or bus request occurs prior to the controller causing the clock signals to be masked and the switch to be off.

3. The computer system defined in claim 1 further comprising a display subsystem, wherein the display subsystem continues to produce a display while in the inactive state.

4. The computer system defined in claim 1 further comprising a processor bus coupled to the processor, a memory coupled to the processor bus that stores data and instructions, and an input/output (I/O) subsystem having an I/O bus and a second processor coupled to the I/O bus that generates bus requests to gain control of the processor bus, wherein the controller, responsive to any bus request from the second processor, causes the processor to exit the reduced power consumption state or prevents the processor from entering the reduced power consumption state if prior to the controller causing the outputs of the PLL from being masked and turning the switch off.

5. The computer system defined in claim 1 wherein the controller asserts a first signal to mask the clocking signals of the PLL.

6. The computer system defined in claim 5 wherein the controller asserts a second signal to turn on the switch.

7. The computer system defined in claim 1 wherein the predetermined time interval is 1/60 of a second.

8. A method for reducing power consumption in a computer system having a processor, a PLL providing clocking signals to the processor and a power supply for supplying power to the processor, said method comprising the steps of:

periodically enabling clock signals to the processor and periodically connecting a supply of power to the processor while the processor is in an inactive state to cycle the processor between a first powered state and a second powered state, where the second powered state comprises a reduced power consumption state, wherein the step of periodically enabling clock signals includes the steps of:
  a periodic task scheduling programming structure running on the processor determining when the processor is inactive, such that the clock signals and power to the processor may be disabled and disconnected, respectively; and
  maintaining the PLL in a locked state while the clock signals are disabled to the processor; and
 exiting the reduced power consumption state in response to a bus requests from an alternative bus master in an input/output (I/O) subsystem of the computer system.

9. The method defined in claim 8 further comprising the step of providing a command indicating that power is to be cycled to the processor, wherein the clocks and power are periodically enabled and disabled to the processor.

10. The method defined in claim 9 further comprising the steps of:
 the processor outputting an idle indication;
 a controller in the computer system receiving the idle indication;
 the controller determining to disable the clocks and disconnect the power to the processor in order to place the processor in the reduced power consumption state;
 and then determining whether an interrupt or bus request occurs.

11. A computer system comprising:
 a processor running a programming structure, wherein the programming structure determines when the processor is in an inactive state using periodic task scheduling and outputs an idle indication in response to determining that the processor is in the inactive state;
 a phase-locked loop (PLL) coupled to supply clocking signals to the processor, wherein the PLL comprises maskable outputs that allow output of the clocking signals to the processor when unmasked and prevent output of the clocking signals when masked, and further wherein the PLL maintains synchronization in a locked state when the maskable outputs are masked,
 a power supply that supplies power to the processor;
 a switch coupled to the power supply and the processor, wherein the switch couples the power supply to the processor when the switch is on and decouples the power supply to the processor when the switch is off;
 a timer coupled to provide a periodic interrupt signal at a predetermined interval to the processor;
 a controller coupled to the processor, the switch and the PLL to place the processor in a reduced power consumption state, wherein the controller, in response to the idle indication, causes masking of the maskable outputs of the PLL to prevent the processor from receiving the clocking signals and turns the switch off to prevent the processor from receiving power, and further wherein the controller, responsive to either the periodic interrupt signal or a bus request from an alternate bus master, causes unmasking of the maskable outputs and turns switch on, thereby causing the processor to exit the reduced power consumption state until such time as the processor outputs the indication again, said controller asserting a first signal to mask the clocking signals of the PLL and a second signal to turn on the switch; and
 abort logic coupled to the controller, responsive to interrupts and bus requests that occur subsequent to the controller receiving and beginning to respond to the indication, to prevent the processor from entering the reduced power consumption state when at least one interrupt or bus request occurs prior to the controller causing the clock signals to be masked and the switch to be off.

12. The computer system defined in claim 11 further comprising a processor bus coupled to the processor, a memory coupled to the processor bus that stores data and instructions, and an input/output (I/O) subsystem having an I/O bus and a second processor coupled to the I/O bus that generates bus requests to gain control of the processor bus, wherein the controller, responsive to any bus request from the second processor, causes the processor to exit the reduced power consumption state or prevents the processor from entering the reduced power consumption state if prior to the controller causing the outputs of the PLL from being masked and turning the switch off.

* * * * *